(12) United States Patent
Li

(10) Patent No.: US 7,513,630 B2
(45) Date of Patent: Apr. 7, 2009

(54) COMPACT DUAL ELLIPSOIDAL REFLECTOR (DER) SYSTEM HAVING TWO MOLDED ELLIPSOIDAL MODULES SUCH THAT A RADIATION RECEIVING MODULE REFLECTS A PORTION OF RAYS TO AN OPENING IN THE OTHER MODULE

(75) Inventor: Kenneth K. Li, Castaic, CA (US)

(73) Assignee: Wavien, Inc., Valencia, CA (US)

( * ) Notice: Subject to any disclaimer, the term of this patent is extended or adjusted under 35 U.S.C. 154(b) by 14 days.

(21) Appl. No.: 11/487,637

(22) Filed: Jul. 17, 2006

(65) Prior Publication Data
US 2006/0256564 A1    Nov. 16, 2006

Related U.S. Application Data

(63) Continuation-in-part of application No. 11/479,032, filed on Jun. 29, 2006, which is a continuation-in-part of application No. 11/274,241, filed on Nov. 14, 2005, which is a continuation of application No. 10/660,492, filed on Sep. 12, 2003, now abandoned, which is a continuation of application No. 09/669,841, filed on Sep. 27, 2000, now Pat. No. 6,634,759.

(60) Provisional application No. 60/699,543, filed on Jul. 15, 2005, provisional application No. 60/192,321, filed on Mar. 27, 2000.

(51) Int. Cl.
*G02B 5/10*      (2006.01)
(52) U.S. Cl. .................... 359/853; 359/858; 362/302
(58) Field of Classification Search ........................ None
See application file for complete search history.

(56) References Cited

U.S. PATENT DOCUMENTS 2,819,649 A    1/1958    McLeod et al.
4,357,075 A    11/1982    Hunter (Continued)

FOREIGN PATENT DOCUMENTS

DE            2201527 A      9/1988

(Continued)

*Primary Examiner*—Stephone B. Allen
*Assistant Examiner*—Jennifer L. Doak
(74) *Attorney, Agent, or Firm*—Fulbright & Jaworski, LLP

(57) ABSTRACT

A compact dual ellipsoidal reflector (DER) system for illuminating a target with rays of electromagnetic radiation comprises first and second molded module. The first molded module has at least a first ellipsoidal reflector section comprising an optical axis, a first focal point and a second focal point. The rays of electromagnetic radiation being directed substantially proximate to the first focal point of the first ellipsoidal reflector section and substantially converge at the second focal point of the first ellipsoidal reflector section. The second molded module has at least a second ellipsoidal reflector section comprising an optical axis, a first focal point and a second focal point. The second ellipsoidal reflector section being positioned and oriented with respect to the first ellipsoidal reflector section to receive at least a portion of the rays of radiation reflected from the first ellipsoidal reflector section and reflect the portion of the rays of radiation to the second focal point of the second ellipsoidal reflector section. The first molded module is placed together with the second molded module to form the compact DER system.

27 Claims, 6 Drawing Sheets

U.S. PATENT DOCUMENTS

| | | |
|---|---|---|
| 4,460,939 A | 7/1984 | Murakami et al. |
| 4,634,276 A | 1/1987 | Sharpe |
| 4,757,431 A | 7/1988 | Cross et al. |
| 4,765,733 A | 8/1988 | Negishi |
| 5,042,931 A | 8/1991 | Mourier |
| 5,414,600 A | 5/1995 | Strobl et al. |
| 5,430,634 A | 7/1995 | Baker et al. |
| 5,515,242 A | 5/1996 | Li |
| 5,653,519 A * | 8/1997 | Dobbs ..................... 362/551 |
| 5,707,131 A | 1/1998 | Li |
| 5,749,642 A | 5/1998 | Kimura et al. |
| 6,142,659 A | 11/2000 | Suzuki et al. |
| 6,144,412 A | 11/2000 | Hirano et al. |
| 6,253,006 B1 | 6/2001 | Heimer |
| 6,874,923 B2 | 4/2005 | Albou et al. |
| 2005/0152154 A1 | 7/2005 | Strambersky et al. |

FOREIGN PATENT DOCUMENTS

| | | |
|---|---|---|
| EP | 0 022 346 A | 1/1981 |
| EP | 0 562 873 A | 9/1993 |
| EP | 0 642 047 A | 9/1994 |
| WO | WO-98/39684 | 9/1998 |

* cited by examiner

COMPACT DUAL ELLIPSOIDAL REFLECTOR (DER) SYSTEM HAVING TWO MOLDED ELLIPSOIDAL MODULES SUCH THAT A RADIATION RECEIVING MODULE REFLECTS A PORTION OF RAYS TO AN OPENING IN THE OTHER MODULE

RELATED APPLICATIONS

This application claims the benefit of U.S. Provisional Application Ser. No. 60/699,543 filed Jul. 15, 2005 and is a continuation-in-part of application Ser. No. 11/479,032, filed Jun. 29, 2006, which is a continuation-in-part of application Ser. No. 11/274,241, filed Nov. 14, 2005, which is a continuation of application Ser. No. 10/660,492, filed Sep. 12, 2003, now abandoned, which is a continuation of application Ser. No. 09/669,841, filed Sep. 27, 2000 (now U.S. Pat. No. 6,634,759), which claims the benefit of U.S. Provisional Application No. 60/192,321 filed Mar. 27, 2000, each of which is incorporated herein by reference in its entirety.

FIELD OF THE INVENTION

The present invention relates to dual ellipsoidal reflector system, particularly a compact dual ellipsoidal reflector system that can be molded easily.

BACKGROUND OF THE INVENTION

An optical collecting and condensing system comprises various optical elements, such as reflectors and lenses that receives lights energy from a light source, such as a light bulb, and directs the light energy toward a target. In particular, the optical system collects and condenses electromagnetic radiation to couple the light energy to a standard waveguide, such as a single fiber or fiber bundle or to output the light energy to a homogenizer of a projector. The functional objective for the optical system is to maximize the brightness (i.e., the flux intensity) of the electromagnetic radiation at the target.

Optical systems for collecting and condensing light from a light source are generally classified as either "on-axis" or "off-axis." In the on-axis systems, the reflectors are positioned on the optical axis between light source, and the target. FIG. 1 illustrates a known on-axis optical system that uses a paraboloid reflector with an imaging lens. The paraboloid reflector has the feature that light energy emanating from a focus is substantially collimated to travel parallel to the optical axis. The optical system of FIG. 1 uses this feature of the paraboloid reflector by positioning the light source at the focus in order to collimate the light from the light source. A condensing lens positioned in the optical stream receives the substantially collimated light energy and redirects the light energy toward the target. In this way, the light energy is collected and condensed at the target. The use of the paraboloid reflector further allows the use of various types of optical filters to improve the performance and durability of the optical system. However, the divergence of the light varies continuously along the reflector, with rays traveling near the optical axis having the greatest divergence. As a result, the magnification of the system varies along the different paths taken by the light emitted from the light source, causing degradation of the brightness of the system. Moreover, the focusing lens produces a distorted image even under perfect conditions and under actual operation typically produces badly aberrated images which effectively increase the image size and reduce flux intensity at the target.

FIG. 2 illustrates another known on-axis optical system. This system uses an ellipsoidal reflector, which ahs the feature that all light emanating from one focal point is directed to a second focal point. The optical system of FIG. 2 uses an ellipsoidal reflector with a light source placed at the first focus and a target placed at the second focus. As in the previous system, the on-axis ellipsoidal system suffers from brightness degradation caused because the divergence of the light varies continuously along the reflector, with rays traveling near the optical axis having the greatest divergence.

Overall, on-axis systems generally suffer from the basic limitations of losing brightness in the coupling, thus degrading the overall efficiency of the optical illumination and projection system. In particular, the divergence of the reflected beam in known on-axis systems is undesirably dependent on the angle of emission from the radiation source. Additionally, the outputs of the on-axis system are substantially circular and symmetric and, therefore, may not be suitable for non-circular targets, such as a rectangular homogenizer for use in projection.

The off-axis optical collecting systems, the reflectors are positioned off the optical axis between the light source and the target. For example, FIG. 3 illustrates an optical system in which the light source is positioned at a focal point of a retro-reflector and the target is positioned on a focal point of a primary reflector, but the reflectors are positioned off the optical axis between the light source and the target. In the illustrated optical system, light energy from the light source reflects from the retro-reflector and travels to the primary reflector. The optical energy then reflects from the primary reflector and converges at the target.

With the off axis system of FIG. 3, the magnification is very close to 1-to-1 for all angles of light when the numerical aperture of the system is small. When the system uses mirrors having higher numerical apertures (e.g., attempts to collect more light energy from the same light source) the larger angle light rays are reflected with high divergence angles, causing the magnification to deviate from 1-to-1. Again, the magnification reduces the brightness at the target and overall decreases the performance of the optical system. The amount of deviation in the magnification depends on the size of the mirror, the radius of curvatures, and the separation of the arc lamp and the target. Accordingly, the off-axis configuration of FIG. 3 is more suitable for applications that use smaller numerical apertures.

Different off-axis optical systems are also known. For example, U.S. Pat. No. 4,757,431 ("the '431 patent") provides a condensing and collecting system employing an off-axis spherical concave reflector which enhances the maximum flux intensity illuminating a small target and the amount of collectable flux density by the small target. Enhancements to the optical system of the '431 patent are provided by U.S. Pat. No. 5,414,600 ("the '600 patent"), in which the off-axis concave reflector is an ellipsoid, and by U.S. Pat. No. 5,430,634 ("the '634 patent"), in which the off-axis concave reflector is a toroid. Although the toroidal system described in the '634 patent corrects for astigmatism, and the ellipsoidal system of the '600 patent provides a more exact coupling than the spherical reflector of the '431 patent, each of these systems requires the application of an optical coating onto a highly curved reflective surface, which is relatively expensive and difficult to apply in a uniform thickness.

Overall, the known off-axis optical systems provide a generally near 1-to-1 (i.e., magnification free) image of the light source at the target and conserve brightness. However, in the known off-axis systems, the magnification deviates from 1-to-1 as the amount of light collected is increased by increasing the collection angle of the reflector. Thus, as a greater portion of light energy from a light source is collected to increase optical intensity, the overall performance of the optical system degrades.

To address problems in the known optical collection and condensing systems, U.S. Pat. No. 6,672,740 provides an on-axis, dual paraboloid reflector system that is advantageous in many respects to other known systems, including the achievement of near 1-to-1 magnification for small-sized light source. This optical collection and condensing system, as illustrated in FIG. 4, uses two generally symmetric paraboloid reflectors that are positioned so that light reflected from the first reflector is received in a corresponding section of the second reflector. In particular, light emitted from the light source is collected by the first paraboloid reflector and collimated along the optical axis toward the second reflector. The second receives the collimated beam of light and focuses this light at the target positioned at the focal point.

To facilitate the description of this optical system, FIG. 4 includes the light paths for three different rays (a, b, and c) emitted from the light source. Ray a travels a relatively small distance before intersecting the first parabolic reflector, but the divergence of ray a at the first parabolic reflectors is relatively large. In contrast, ray c travels further between the light source and the first parabolic reflector but has a smaller relative divergence at the first parabolic reflector but has a smaller relative divergence at the first reflector. Ray b, positioned between rays a and c, travels an intermediate distance before intersecting the first parabolic reflector and has an intermediate divergence. In this optical system, due to the symmetry of the two parabolic reflectors, the rays a, b, and c are reflected at corresponding positions in the second parabolic reflector such that the distance fro each ray between the second parabolic reflector and the target is the same as the distance between the second parabolic reflector and the target is the same as the distance between the light source and the first parabolic reflector. In this way, the second reflector compensates for the divergence. Consequently, the optical system collects and condenses light energy from the light source with a near 1-to-1 magnification and preserves the brightness of the light source.

The optical system of FIG. 4 may further employ a retroreflector in conjunction with the first paraboloid reflector to capture radiation emitted by the source in a direction away from the first paraboloid reflector and reflect the captured radiation back through the source. In particular, the retroreflector has a generally spherical shape with a focus located substantially near the light source (i.e., at the focal point of the first paraboloid reflector) toward the first paraboloid reflector to thereby increase the intensity of the collimated rays reflected therefrom.

Since on-axis, dual-paraboloid optical system arises because the light source is very close to the apex side of the reflector in the above described on-axis, dual-paraboloid optical system, the system produces a large angle of divergence near the light source (i.e., along the paths similar to ray a). In particular, a large angle of divergence causes light energy traveling along a path similar to ray a to compass a relatively large area on the second paraboloid reflector, thus producing unwanted aberrations and a loss of brightness.

Accordingly, some have used dual ellipsoid reflector (DER) system in place of the dual paraboloid reflector (DPR) system to collect and concentrate electromagnetic radiation. The DER has a longer focal length than the DPR for the same outer system dimension. However, the DER reflector sections are in opposite sides of the optical axis, thus the two reflector sections cannot be molded together.

SUMMARY OF THE INVENTION

In accordance with an embodiment of the present invention, a compact DER system for collecting and condensing electromagnetic radiation is provided, wherein the DER module can be molded easily to provide a compact DER system. In accordance with an exemplary embodiment of the present invention, the reflectors of the DER system can be molded from plastic or glass for low wattage applications.

In accordance with an exemplary embodiment of the present invention, a compact DER system for collecting and condensing electromagnetic radiation employs opposing molded ellipsoidal reflector sections to achieve unit magnification, or near unit magnification, between a source image and a focused image at a target, thereby producing maximum focused intensity at the target. In particular, the present invention is directed to an optical device for collecting electromagnetic radiation from a source of electromagnetic radiation and focusing the collected radiation onto a target to be illuminated with at least a portion of the electromagnetic radiation emitted by the source. The device comprises a first and second molded ellipsoidal reflector sections or modules, each reflector section generally comprising at least a portion of an ellipsoid of revolution and has an optical axis and two focal points on the optical axis. A light source located proximate one of the focal points of the first molded ellipsoid reflector section produces rays of radiation that converge at the second focal point of the first molded ellipsoidal reflector section. The second molded ellipsoidal reflector section is positioned and oriented with respect to the first molded ellipsoidal reflector section so that the rays of radiation reflected from the first molded ellipsoidal reflector section converge at a one focal point of the second molded ellipsoidal reflector section. The rays of radiation then continue until reflected by the second molded ellipsoidal reflector section and focused toward a target located proximate a second focal point of the second molded ellipsoidal reflector section. The first and molded ellipsoidal reflector sections have substantially the same size and shape and can be oriented optically about symmetrically with respect to each other so that each ray of radiation reflected by a surface portion of the first molded ellipsoidal reflector section is reflected by a corresponding surface portion of the second molded ellipsoidal reflector section toward the target to achieve a unit or near unit magnification.

In accordance with an embodiment of the present invention, a compact DER system for collecting and condensing electromagnetic radiation employs opposing asymmetric ellipsoidal reflector sections and optimizes magnification between a source image and a focused image at a target, thereby producing maximum focused intensity at the target. In particular, the present invention is directed to an optical device for collecting electromagnetic radiation from a Source of electromagnetic radiation and focusing the collected radiation onto a target to be illuminated with at least a portion of the electromagnetic radiation emitted by the source. The device comprises a first and second molded ellipsoidal reflector sections or modules, which are asymmetric with each other (i.e., different ellipticity or eccentricity). The first molded ellipsoid reflector section comprises at least a portion of an ellipsoid of revolution and has an optical axis A and a focal point on the optical axis A. A light source located proximate the focal point of the first molded ellipsoidal reflector section produces collimated rays of radiation reflected from the first molded ellipsoidal reflector section in a direction parallel to the optical axis A. The second molded ellipsoidal reflector section comprises at least a portion of an ellipsoid of revolution and has an optical axis B and a focal point on the optical axis B.

The second molded ellipsoidal reflector section is positioned and oriented with respect to the first molded ellipsoidal reflector section so that the rays of radiation reflected from the first molded ellipsoidal reflector section are reflected by the second molded ellipsoidal reflector section and focused toward a target located proximate the focal point of the second molded ellipsoidal reflector section. The first and second molded ellipsoidal reflector sections are asymmetric with respect to each other. That is, the first and second molded ellipsoidal reflector sections have slightly different shapes and sizes, i.e., different ellipticity or eccentricity. Alternatively, the second molded ellipsoidal reflector section is positioned and oriented with respect to the first molded ellipsoidal reflector section so that the rays of radiation reflected from the first molded ellipsoidal reflector section converge at a focal point of the second molded ellipsoidal reflector section. The rays of radiation then continue until reflected by the second molded ellipsoidal reflector section and focused toward a target located proximate a second focal point of the second molded ellipsoidal reflector section. The first and second molded ellipsoidal reflector sections can be oriented optically about asymmetrically with respect to each other to optimize magnification.

A molded retro-reflector section can be used in conjunction with the first molded ellipsoidal reflector section to capture radiation emitted by the light source in a direction away from the first molded ellipsoidal reflector section and reflect the captured radiation back through the source (i.e., through the focal point of the first molded ellipsoidal reflector section) toward the first molded ellipsoidal reflector section to thereby increase the intensity of the rays reflected therefrom.

The first and second molded ellipsoidal reflector sections are arranged in an opposed, facing relationship with their respective optical axes arranged in parallel with respect to each other, or they can be arranged with their optical axes arranged at an angle with respect to each other, in which case a redirecting reflector is employed to redirect the rays reflected by the first molded ellipsoidal reflector section toward the second molded ellipsoidal reflector section.

In accordance with an exemplary embodiment of the present invention, a compact DER system for illuminating a target with rays of electromagnetic radiation comprises first and second molded ellipsoidal reflector sections. The first molded ellipsoidal reflector section comprises a first focal length, a first focal point and a first optical axis, the rays of electromagnetic radiation being directed substantially proximate to the first focal point of the first molded ellipsoidal reflector section. The second molded ellipsoidal reflector section comprises a second focal length, a second focal point and a second optical axis, which is not coincident with the first optical axis. The second molded ellipsoidal reflector section being positioned and oriented with respect to the first molded ellipsoidal reflector section to receive at least a portion of the rays of radiation reflected from the first molded ellipsoidal reflector section and reflect the portion of the rays of radiation to a target located substantially proximate to the second focal point of the second molded ellipsoidal reflector section. The second molded ellipsoidal reflector section being asymmetric with respect to the first molded ellipsoidal reflector section.

In accordance with an exemplary embodiment of the present invention, the focal length of the second molded ellipsoidal reflector section is longer than the focal length of the first molded ellipsoidal reflector section, which lowers the incidence angle of the rays of radiation inputted to the target, thereby reducing the Fresnel reflection loss.

In accordance with an exemplary embodiment of the present invention, the asymmetric characteristics of the first and second molded ellipsoidal reflector sections are selected to maximize net output coupling efficiency.

In accordance with an exemplary embodiment of the present invention, the focal length difference between the focal lengths of the two molded ellipsoidal reflector sections is selected to optimize the tradeoff between Fresnel reflection loss and image aberration, thereby providing a maximum net output coupling efficiency.

In accordance with an exemplary embodiment of the present invention, a compact DER system for illuminating a target with rays of electromagnetic radiation comprises first and second molded ellipsoidal reflector sections. The first molded ellipsoidal reflector section comprises a first focal length, a first focal point, a second focal point, and a first optical axis. The rays of electromagnetic radiation being directed substantially proximate to the first focal point of the first molded ellipsoidal reflector section to reflect from the first molded ellipsoidal reflector section and substantially converge at the second focal point. The second molded ellipsoidal reflector section comprises a second focal length, a first focal point and a second focal point and a second optical axis, which is not coincident with the first optical axis. A target being located substantially proximate to the first focal point of the second molded ellipsoidal reflector section to receive at least a portion of the rays of radiation that pass through the second focal point of the second molded ellipsoidal reflector section and are reflected by the second molded ellipsoidal reflector section to substantially converge at the first focal point of the second molded ellipsoidal reflector section. The second molded ellipsoidal reflector section being positioned and oriented with respect to the first molded ellipsoidal reflector section such that the second focal point of the first molded ellipsoidal reflector section and the second focal point of the second molded ellipsoidal reflector section are positioned substantially proximate. The second molded ellipsoidal reflector section being asymmetric with respect to the first reflector, which optimizes net output coupling efficiency.

In accordance with an exemplary embodiment of the present invention, the compact dual ellipsoidal reflector (DER) system for illuminating a target with rays of electromagnetic radiation comprises first and second molded module. The first molded module has at least a first ellipsoidal reflector section comprising an optical axis, a first focal point and a second focal point. The rays of electromagnetic radiation being directed substantially proximate to the first focal point of the first ellipsoidal reflector section and substantially converge at the second focal point of the first ellipsoidal reflector section. The second molded module has at least a second ellipsoidal reflector section comprising an optical axis, a first focal point and a second focal point. The second ellipsoidal reflector section being positioned and oriented with respect to the first ellipsoidal reflector section to receive at least a portion of the rays of radiation reflected from the first ellipsoidal reflector section and reflect the portion of the rays of radiation to the second focal point of the second ellipsoidal reflector section. The first molded module is placed together with the second molded module to form the compact DER system.

In accordance with an exemplary embodiment of the present invention, the compact DER system comprises a color wheel located substantially proximate the second focal point of the first ellipsoidal reflector section such that light existing the compact DER system through the target forms a sequential color sequence.

Filters or other optical elements can be arranged between the collimating and focusing reflectors.

Various other objects, advantages and features of the present invention will become readily apparent from the ensuing detailed description, and the novel features will be particularly pointed out in the appended claims.

DESCRIPTION OF THE DRAWINGS

The following detailed description, given by way of example, and not intended to limit the present invention solely thereto, will best be understood in conjunction with the accompanying drawings in which like components or features in the various figures are represented by like reference numbers.

DETAILED DESCRIPTION OF EXEMPLARY EMBODIMENTS

Figure 1:
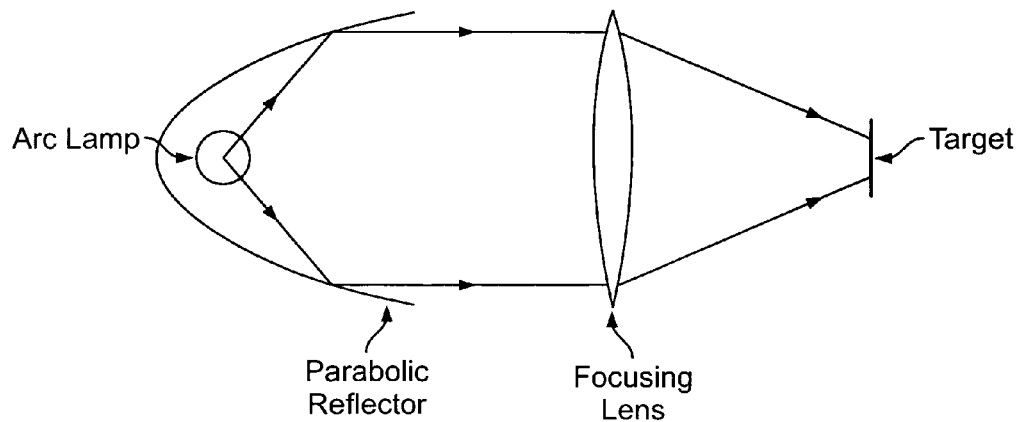
FIG. 1 is a schematic diagram, shown in cross-section, of a known on-axis condensing and collecting optical system that uses a paraboloid reflector and a focusing lens.
Figure 2:
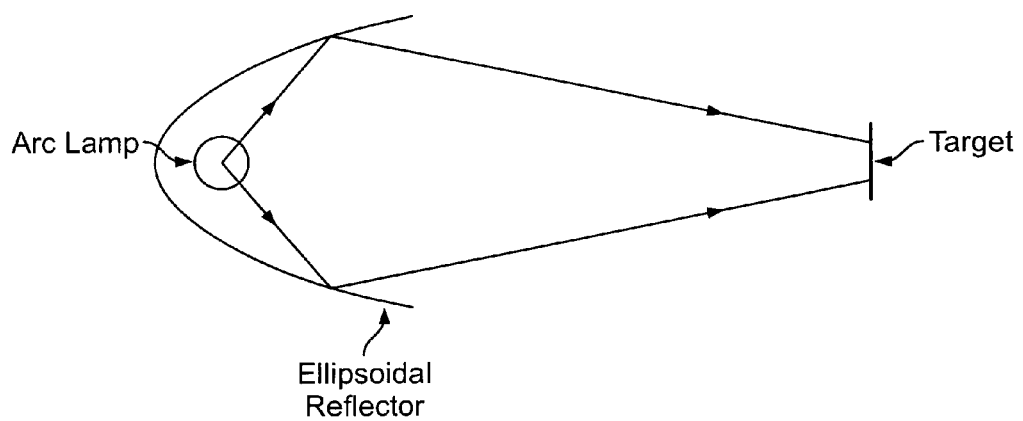
FIG. 2 is a schematic diagram, shown in cross-section, of a known on-axis condensing and collecting optical system that uses an ellipsoidal reflector.
Figure 3:
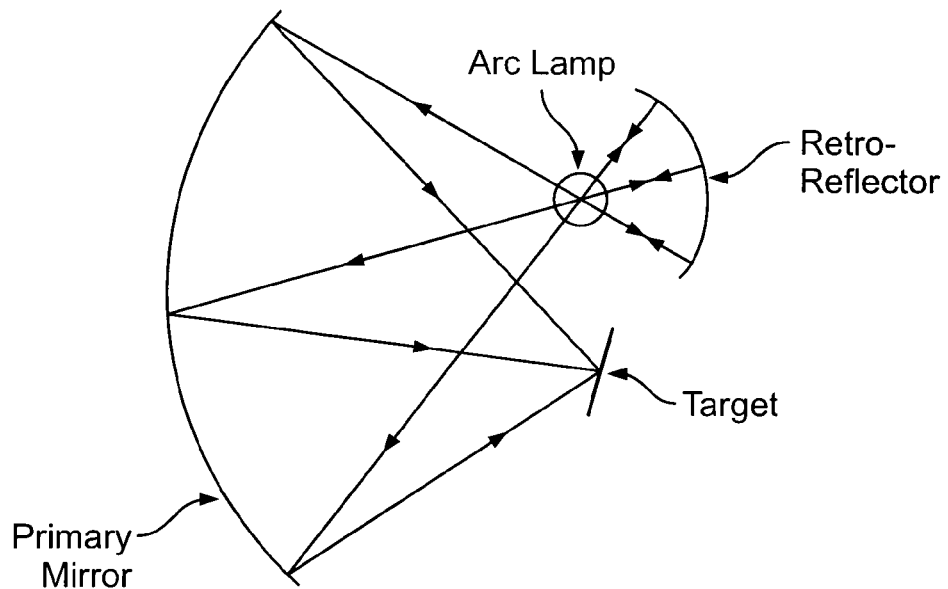
FIG. 3 is a schematic diagram, shown in cross-section, of a known off-axis condensing and collecting optical system.

With reference to the figures, exemplary embodiments of the invention are now described. These embodiments illustrate principles of the invention and should not be construed as limiting the scope of the invention.

In accordance with an exemplary embodiment of the present invention, DER system comprising a lamp 10 or light saver, retro-reflector 40, first ellipsoidal section 20, second ellipsoidal section 30. The output is taken at the focus 34 of 30. The target is preferably a tapered light pipe (TLP) 50. Since the elliptical reflector distorts focused images, the image at focus 36 will be distorted by 20, and substantially compensated by 30 and as a result, the image at 34 is substantially the same as the arc itself.

Turning now to FIGS. 5-6 and 8-10, there illustrated a compact dual ellipsoidal reflector system in accordance exemplary embodiments of the present invention. The electromagnetic source 10 is preferably a light source having an envelope 12. Most preferably, the source 10 comprises an arc lamp such as a xenon lamp, a metal-halide lamp, a HID lamp, or a mercury lamp. For certain applications, filament lamps, e.g., halogen lamps, can be used, provided the system is modified to accommodate the non-opaque filaments of the lamp, as will be described in more detail below. However, any source of electromagnetic radiation which is of similar size to or smaller than the target may be used (e.g., fiber, filament lamp, gas discharge lamp, laser, LED, semiconductor, etc.)

The size of the electromagnetic source here is better defined by the 1/e intensity of the intensity contour map which characterizes the brightness (flux density over angular extent) of the source. Brightness is related to the size of the arc gap and determines the theoretical limit of coupling efficiency. For the specific case of an arc lamp, the contour approximates axial symmetry and is a complex function of electrical rating, electrode design and composition, gas pressure, arc gap size, and gas composition. For the specific case of an arc lamp having an aspherical curved envelope, the effective relative position and intensity distribution of the source imaged by the reflector undergoes aberration. This is caused by the shape of the envelope which essentially functions as a lens and requires a compensating optical element. Optical compensation can be achieved either by modifying the design of the reflector to compensate for the astigmatism caused by the envelope or by inserting a correcting optic between the source and the target. Additionally, optical coatings can be applied to the envelope to minimize Fresnel reflections and thereby maximize collectable radiation at the target or to control and/or filter the radiation flux.

The first molded ellipsoidal reflector section 20 comprises a portion of an ellipsoid of revolution having an optical axis 22 and focal points 24 and 26. The first molded ellipsoidal reflector section 20 preferably has a reflective coating 28 (e.g., aluminum or silver) and the surface is highly polished. For certain applications, the first molded ellipsoidal reflector section 20 can be made from plastic or glass coated with a wavelength-selective multi-layer dielectric coating. For example, the coating 28 may be a cold coating with high reflectivity only in the visible wavelengths for use in visual light applications. With the source 10 placed at the first focal point 24 of the first molded ellipsoidal reflector section 20, electromagnetic radiation that contacts the first molded ellipsoidal reflector section 20 is reflected as a beam of energy that converges the second focal point 26 of the first molded ellipsoidal reflector section 20. Where the source 20 is an arc lamp, the arc gap is preferably small compared to the focal length of the first molded ellipsoidal reflector section 20.

The second molded ellipsoidal reflector section 30 comprises a portion of an ellipsoid of revolution having an optical axis 32 and focal points 34 and 36. The second molded ellipsoidal reflector section 30 can also have a coating 38, as described above to selectively reflect light energy. The second molded ellipsoidal reflector section 30 can be substantially similar in size and/or shape or differ in shape and/or size from first molded ellipsoidal reflector section 20. That is, the first and second molded ellipsoidal reflector sections can be symmetric or asymmetric with respect to each other.

The second molded ellipsoidal reflector section 30 is positioned and oriented so that the electromagnetic radiation reflected by the first molded ellipsoidal reflector section 20 converges at the second focal point 36 of the second molded ellipsoidal reflector section 30. The radiation continues until impinging the surface of the second molded ellipsoidal reflector section 30 and is thereafter focused toward the first focal point 34 of the second molded ellipsoidal reflector section 30. In order to optimizes magnification between the first molded ellipsoidal reflector section 20 and the second molded ellipsoidal reflector section 30 (i.e., a focused image that is substantially the same size as the source), it is important that each ray of electromagnetic radiation reflected and focused by a surface portion of the first molded ellipsoidal reflector section 20 be reflected and focused by a substantially corresponding surface portion of the second molded ellipsoidal reflector section 30 in order to achieve a focus at the first focal point 34 that is of the maximum possible brightness. In the context of the present disclosure, orienting and positioning the first molded ellipsoidal reflector section 20 and the second molded ellipsoidal reflector section 30 with respect to each other so that each ray of electromagnetic radiation collimated by a surface portion of the first molded ellipsoidal reflector section 20 is focused by a substantially corresponding surface portion of the second molded ellipsoidal reflector section 30.

Figure 6:
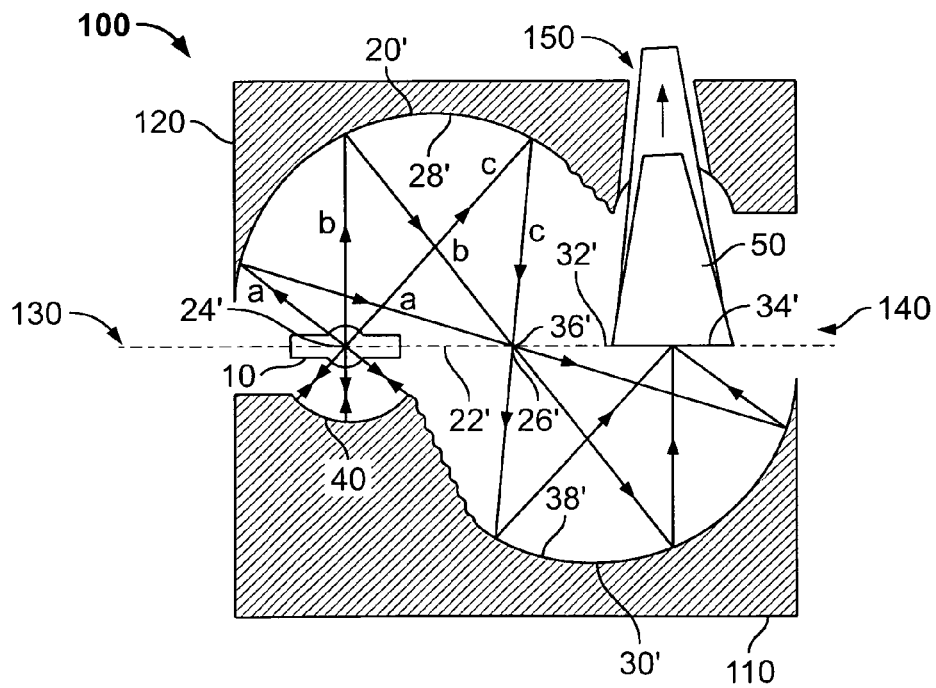
FIG. 6 is a schematic diagram, shown in cross-section, of a condensing and collecting optical system using two molded reflectors of greater eccentricity in accordance with an exemplary embodiment of the present invention.

The target 50 is a small object requiring illumination with the highest intensity possible. In an exemplary embodiment of the present invention, the target 50 is a waveguide, such as a light pipe, a tapered light pipe, single core optic fiber, a fused bundle of optic fibers, and a fiber bundle, as illustrated in FIG. 6. An input end of the target (e.g., a proximal end of the optic fiber) is positioned at the first focal point 34 of the second molded ellipsoidal reflector section 30 to receive the focused rays of electromagnetic radiation reflected by the second molded ellipsoidal reflector section 30.

When the optical collection and condensing systems of the present invention are applied to applications for illuminations or projection of an image, there is a need to homogenize the output intensity profile at the target such that the output is more uniform. For example, for illumination during a medical procedure such as endoscopy, it is desirable to have uniform illumination so that the doctor can observe areas in the center and the periphery of the illumination with equal clarity. In the case of illuminations using optical fibers, the uniform intensity allows higher power to be coupled to a particular fiber optic configuration without being damaged by hot spots. In the case of projections, the uniform intensity will be needed to produce a uniform intensity profile at the screen. In particular, it is desirable for visual aesthetics that the center and the periphery of the displayed image have equal level of illumination.

Figure 5:
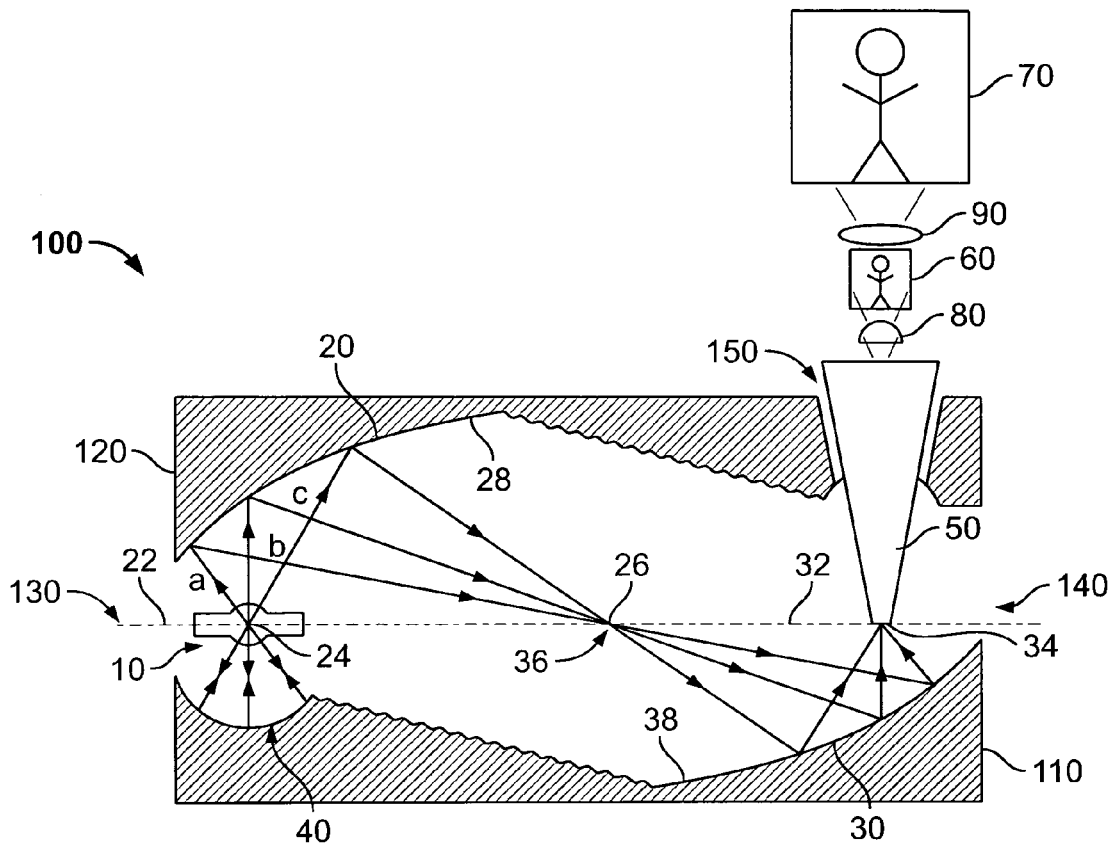
FIG. 5 is a schematic diagram, shown in cross-section, of an off-axis condensing and collecting optical system using two molded ellipsoidal reflectors in accordance with an exemplary embodiment of the present invention.
Figure 7A:
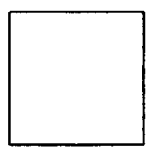
FIGS. 7a-7j are schematic views of a plurality of waveguide targets in cross-sections which may be employed in embodiments of the present invention.
Figure 7B:
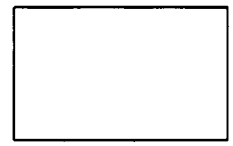
Figure 7C:
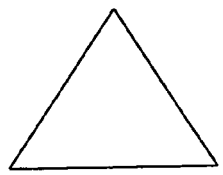
Figure 7D:
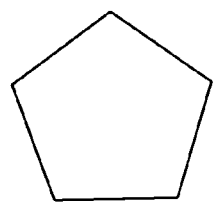
Figure 7E:
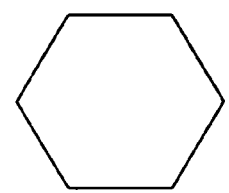
Figure 7I:
Figure 7F:
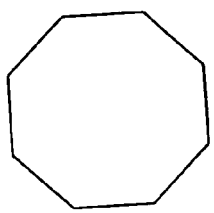
Figure 7G:
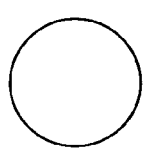
Figure 7H:
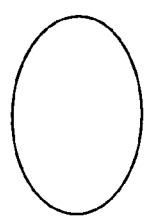

Accordingly, the target may be a homogenizer, as illustrated in FIG. 5 that adjusts the output intensity profile. The waveguide may be polygonal (square, rectangle, triangle, etc.) in cross-section as shown in as shown in FIGS. 7a-7f or rounded (circular, elliptical, etc.) in cross-section as shown in as shown in FIGS. 7g-7h.

Figure 7J:

Depending on the output requirement in terms of numerical aperture and size, the homogenizer can be tapered from smaller to larger sizes or vice versa. Thus, the target 50 can be an increasing taper waveguide as shown in FIG. 7i, or a decreasing taper waveguide as shown in FIG. 7j. In this way, the homogenizer allows changes in the shape of the output of the illumination. For example in projection displays in which an image source 60 is placed in the output stream of the target 50 through a condenser lens 80 and a projection lens 90 to create a projected image 70, the ideal output of the homogenizer will be rectangular with a ratio of width-to-height of 4-to-3 or 16-to-9, or other ratios, depending on the format of the displays. Nevertheless, the angle of the illuminating radiation in both directions should be similar and such that a circular projection lens 90 can be used with the optical system efficiently.

Figure 8:
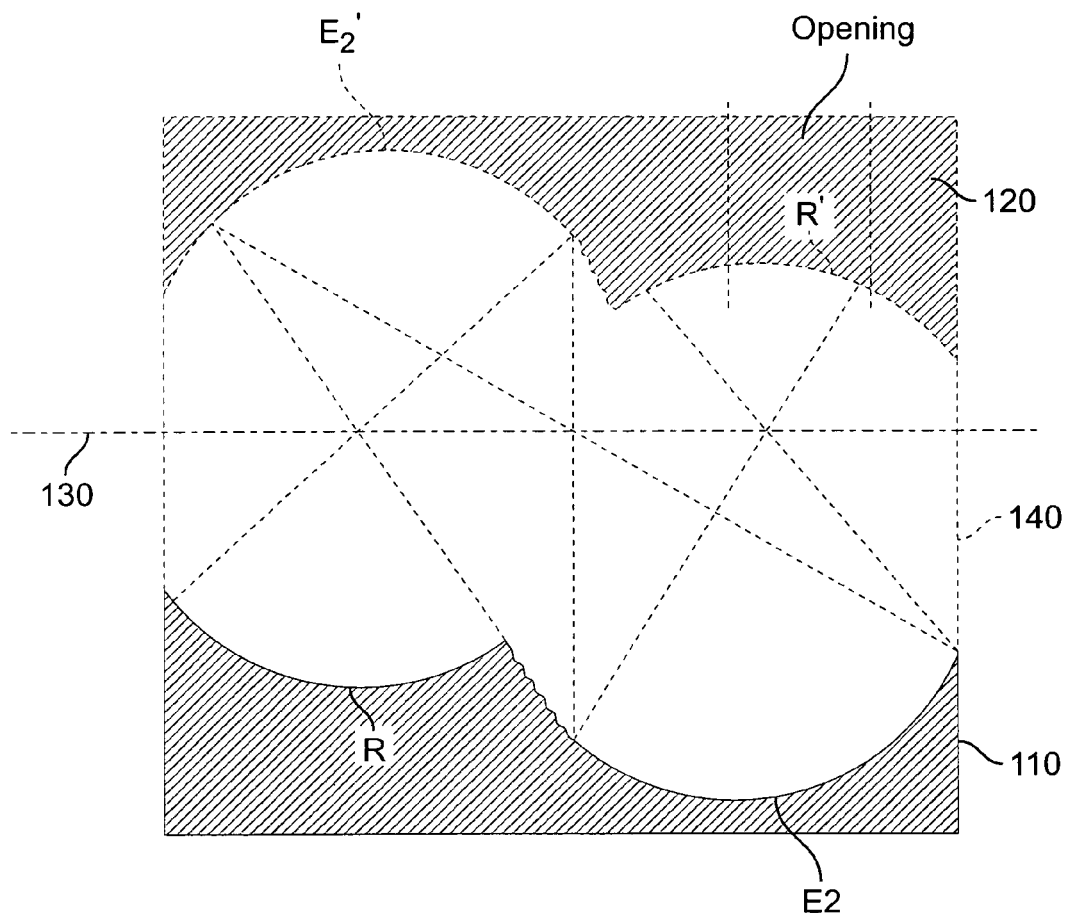
FIG. 8 is a schematic view of a compact dual ellipsoidal reflector (DER) system in accordance with an exemplary embodiment of the present invention.

While the target and the source are intimately associated with the collecting and condensing system of the present invention, in accordance with an exemplary embodiment of the present invention as shown in FIGS. 5-6 and 8, the system relates to the use of two molded ellipsoidal reflector sections of substantially similar size and/or shape arranged so as to share a single focal point (i.e., the second focal point 26 of the first molded ellipsoidal reflector section 20 and the second focal point 36 of the second molded ellipsoidal reflector section 30 are located substantially identical positions).

Continuing with the description of the collecting an condensing system, in the arrangements shown in FIGS. 5-6 and 8-9, the first molded ellipsoidal reflector section 20 and the second molded ellipsoidal reflector section 30 are positioned in an opposed, facing relation with respect to each other so as to be concave toward each other. Optical symmetry is achieved in the arrangements of FIGS. 5-6 and 8 by arranging the first molded ellipsoidal reflector section 20 and the second molded ellipsoidal reflector section 30 so that their respective optical axes 22 and 32 are collinear and so that the reflective surface of the first molded ellipsoidal reflector section 30 is an opposed, facing relation with the substantially corresponding reflecting surface of the second molded ellipsoidal reflector section 30 achieving unit or new unit magnification.

Figure 4:
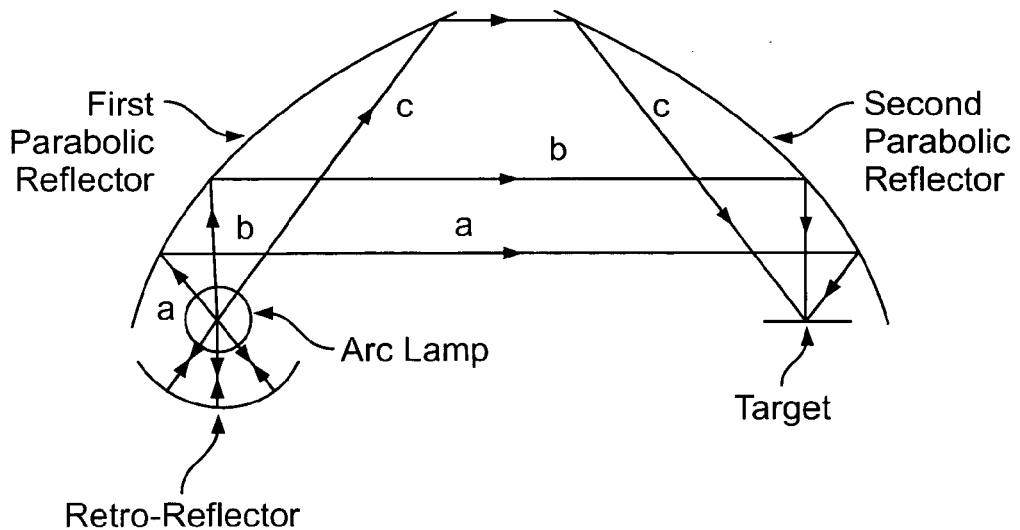
FIG. 4 is a schematic diagram, shown in cross-section, of a known on-axis condensing and collecting optical system that uses two paraboloid reflectors.

In FIGS. 5-6, three rays a, b, and c are drawn to illustrate the function of the reflectors in view of different possible paths for the electromagnetic radiation produced by the source 10. In FIGS. 5-6, the rays a, b, and c are in substantially the same positions as in FIG. 4 in order to illustrate the effectiveness of the present optical system in reducing aberration. Each of the rays a, b, and c emitted from the light source 10 impinges the first molded ellipsoidal reflector section 20 at a different point, each point having a different distance from source 10. But each of the rays a, b, and c is also focused onto the target 50 from a corresponding position of the second molded ellipsoidal reflector section 30, thus produces a substantially 1:1 magnification or slight magnification for the three rays.

As before, ray a has the shortest distance from the source 10 and the first molded ellipsoidal reflector section 20 and consequentially produces a larger divergence in comparison to rays b and c. With the optical system of the present invention, radiation from the light source is focused from the first focal point 24 of the first molded ellipsoidal reflector section 20 to the second point 26. As a result, the distances traveled by the radiation from the source 10, even those emitted at high angles such as ray a, is relatively larger than the corresponding distance in the system of FIG. 4 that uses paraboloid reflectors. The larger distance reduces the amount of aberration because the distances of rays a, b, and c are now relatively more uniform.

To reduce aberration even further, FIG. 6 shows an exemplary embodiment of the present invention in which the first and second molded ellipsoidal reflector sections 20' and 30' have greater eccentricity (i.e., the first and second molded ellipsoidal reflector sections are more circular). As a result of the greater curvature of the first and second molded ellipsoidal reflector sections 20' and 30' in this exemplary embodiment, the distance between the first focus 24' of the first molded ellipsoidal reflector section 20' and the first focus 34' of the second molded ellipsoidal reflector section 30' is reduced. At the same time, the greater curvature of the molded ellipsoidal reflector sections 20' and 30' increases the distance between the first molded ellipsoidal reflector section 20' and its first focus 24' along ray a. Likewise, the corresponding distance between the second molded ellipsoidal reflector section 30' and its first focus 34' along ray a is increased. As a result, the distances traveled between the radiation source 10' and the first molded ellipsoidal reflector section 20' (as well as the total distance between the source 10' and the target 50') for the rays a, b, and c in FIG. 6 are relatively more uniform in comparison to the embodiment of FIG. 5. This feature allows the system to produce less aberration between the light source and the target, even with electromagnetic energy traveling near the optical axis 22', such as energy traveling paths similar to ray a.

By comparing the path of the same ray c in FIGS. 5 and 6, it can be seen that the embodiment of FIG. 6 uses molded ellipsoidal reflector sections 20' and 30' covering a greater portion of an ellipsoid in order to collect the same angle of output radiation from the source 10. However, it can be seen that molded ellipsoidal reflector sections 20' and 30' in FIG. 6 have approximately the same diameter as molded ellipsoidal reflector sections 20' and 30' in FIG. 5.

As shown in FIGS. 5 and 6, the collecting and condensing system of the present invention can incorporate the use of a retro-reflector section 40, which, in the illustrated embodiment, is a spherical retro-reflector. The retro-reflector section 40 is positioned to capture electromagnetic radiation emitted by the source 10 that would not otherwise impinge on the first molded ellipsoidal reflector section 20. More particularly, the spherical retro-reflector section 40 is constructed and arranged so that radiation emitted by the source 10 in a direction away from the first molded ellipsoidal reflector section 20 is reflected by the retro-reflector section 40 back through the first focal point 24 of the first molded ellipsoidal reflector section 20 and thereafter toward the first molded ellipsoidal reflector section 20. This additional radiation reflected by the first molded ellipsoidal reflector section 20 is added to the radiation that impinges the first molded ellipsoidal reflector section 20 directly from the source 10 to thereby increase the intensity of the radiation reflected toward the second molded ellipsoidal reflector section 30. Consequently, the intensity of the radiation at the first focal point 34 of the second molded ellipsoidal reflector section 30 is also increased.

If a filament lamp is employed as the source 10, the retro-reflector cannot be oriented so that it focuses radiation back through the first focal point 24 of the first molded ellipsoidal reflector section 20, because the retro-reflected radiation would be blocked by the opaque filaments located at the first focal point 24. In this case, the position of the retro-reflector section 40 can be changed with respect to the source 10 before the reflector sections are molded so that the retro-reflected radiation passes near but not precisely through the first focal point 24.

It should be appreciated that, although the above embodiments describe configurations with first and second molded reflector sections having an ellipsoidal shape, it is known and anticipated by the present invention that first and second molded ellipsoidal reflector sections 20 and 30 may be approximated using shapes that are slightly different from an ideal geometric ellipsoid shape. For example, the first and second molded ellipsoidal reflector sections 20 and 30 may have altered ellipsoidal shapes to compensate of various parameters, such as bulb envelops, filters, etc. In this case, the deviation in the shape of the generally ellipsoidal reflector sections 20 and 30 can be small and the final output may be slightly different from the optimum. Deviations in the shape of the reflector sections can also be introduced to reduce cost of the molded ellipsoidal reflector sections 20 and 30, or increase performance for particular lamp types and arc shapes.

In accordance with an exemplary embodiment of the present invention, the compact or molded dual ellipsoidal reflector (DER) system 100 of FIG. 8 comprises, a first molded ellipsoidal reflector section $E_2'$, a second molded ellipsoidal reflector section E2 and an opening 150 for a TLP 50 (not shown), wherein the two molded ellipsoidal reflector sections $B_2'$ and E2 are symmetric.

Figure 10:
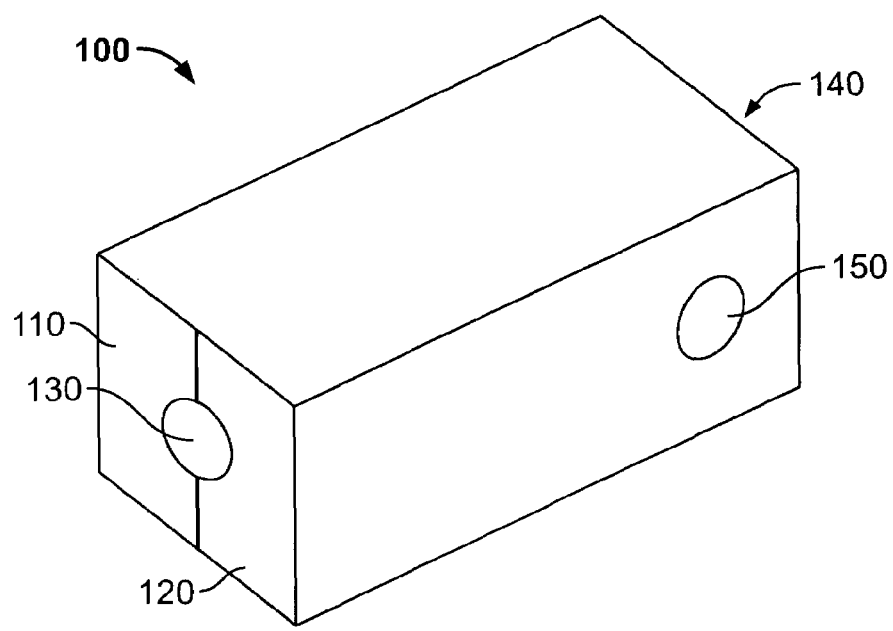
FIG. 10 are schematic drawings of a compact DER system comprising DER modules in accordance with an exemplary embodiment of the present invention.

Turning to FIG. 8, the compact DER system 100 of the present invention can utilize plastic or glass molding. The retro-reflector section R and elliptical reflector section E2 are molded on a first molded DER module 110 as shown. A second molded DER module 120 of the same molding can be turned around and placed together with the first molded DER module 110 to form the compact DER system 100 in accordance with an exemplary embodiment of the present invention, as shown in FIG. 10. The elliptical reflector section E2 becomes an ellipsoidal reflector section $B_2'$ and retro-reflector section R becomes retro-reflector sections R' as shown. In this case, the molded ellipsoidal reflector section $E_2'$ is used in place of the ellipsoidal reflector section 20, the molded ellipsoidal reflector section E2 is used in place of the ellipsoidal reflector section 30, and the molded retro-reflector section R is used in place of the retro-reflector section 40, as shown in FIGS. 5-6. The retro-reflector section R" is not used as a reflector. Instead, an opening 150 can be made through the retro-reflector section R' such that a target 50, e.g., a TLP 50, can be inserted and aligned to the focus or focal point 34.

In accordance with an aspect of the present invention, the compact DER system 100 additionally comprises a color wheel (not shown) located substantially proximate the second focal point of the first ellipsoidal reflector section such that light existing the compact DER system 100 through the target forms a sequential color sequence.

Figure 9:
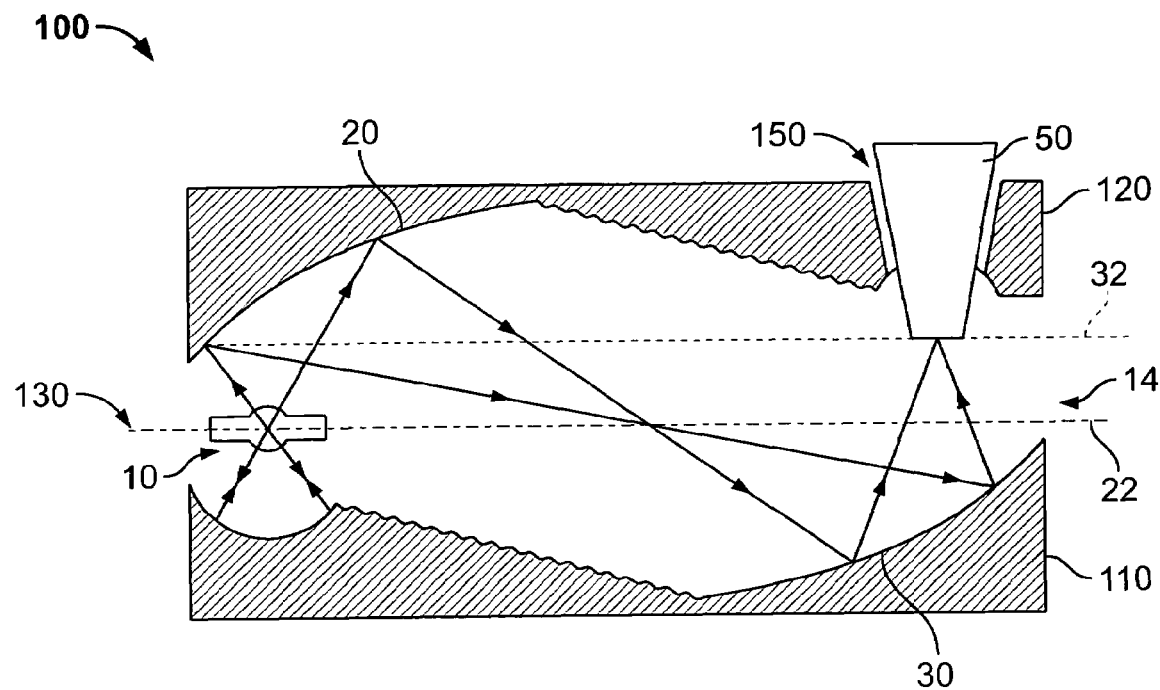
FIG. 9 is a schematic view of a compact DER system in accordance with an exemplary embodiment of the present invention.

In accordance with an exemplary embodiment of the present invention, the compact or molded DER system 100 of FIG. 9 comprises the electromagnetic source 10, a first molded ellipsoidal reflector section 20, a second molded ellipsoidal reflector section 30, a molded retro-reflector section 40 and an opening 150 for a TLP 50, wherein the two molded ellipsoidal reflector sections 20, 30 are asymmetric such that that slight magnification is applied. The molded retro-reflector section 40 and second molded elliptical reflector section 30 can be molded on the first molded DER module 110 as shown in FIG. 9. The first molded ellipsoidal reflector section 20 and the opening 150 can be molded on the second molded DER module 120 as shown in FIG. 9. That is, the ellipticity or eccentricity of two ellipsoidal reflector section is different.

The ellipticity or eccentricity defines the shape of an ellipsoid, i.e., the deviation from a sphere. A sphere has eccentricity of zero and paraboloid has eccentricity of 1. The eccentricity is defined as $e=c/a$ where c is the focal distance from the center and a is length of semi-major axis. It is appreciated that every ellipsoid has a semi-major and semi-minor axes. The eccentricity can be also defined as a square root of $(1-(b\ \text{square}/a\ \text{square}))$ where b is the length of the semi-minor axis.

In accordance with an aspect of the present invention, the second molded ellipsoidal reflector section 30 is larger than the first molded ellipsoidal reflector section 20 and has longer focal length than the second molded ellipsoidal reflector section 30. The slight magnification introduces a small amount of image distortion but the input light to the TLP 50 has smaller angles of incidence, thereby reducing the Fresnel loss.

The first molded ellipsoidal reflector section 20 has an optical axis 22 (or axis of focus 22) and the second molded ellipsoidal reflector section 30 has an optical axis 32 (or axis of focus 32). The two axes 22, 32 are not coincident. The resultant light incidence onto the TLP 50 from the second molded ellipsoidal reflector section 30. When the output section or second molded ellipsoidal reflector section 30 is trimmed to the same focal plane 22 as the input section or first molded ellipsoidal reflector section 20, the axis of focus 32 of the output section or second molded ellipsoidal reflector section 30 will lie outside the DER system 200. This advantageously result in incidence angle being smaller than ±90°, which reduces the effect of Fresnel reflection.

It is appreciated that the DER system 100 can be designed using ray tracing. The gain by reducing the Fresnel reflection in the present invention is partly lost by slight distortion of the image due to asymmetry of the DER system 100. As a result, the present system optimizes the tradeoff between the Fresnel reflection loss and the image aberration or distortion that maximizes the net output coupling efficiency.

Turning now to FIG. 10, there is illustrated a schematic diagram of a compact DER system 200 in accordance with an exemplary embodiment of the present invention comprising the two molded modules 110 and 120 of FIG. 8 or 9. The lamp or light source 10 can be inserted into an opening 140 on one side of the DER system 100, as shown in FIGS. 5, 6 and 9, and a fan (not shown) can be placed in the opening 150 on the other side of the DER system 100 for cooling. The output TLP can be placed in the opening 150 in the second molded DER module 120.

Several examples of the present invention are now provided. These examples are meant to illustrate some possible implementations of the present invention but are not intended to limit the scope of the present invention.

EXAMPLES

A first pair of exemplary optical systems in accordance with the present invention uses a low wattage lamp, in the order of 100 Watts, as the lights source. In the compact DER system 100 in accordance exemplary embodiment of the present invention, each of the first and second molded ellipsoidal reflector sections has a diameter of 2.5 inches, and the separation between the source and target (i.e., the distance between the foci) is about 5 inches. For a low wattage reflection system, the ellipsoidal reflector sections can have a greater eccentricity in accordance with an exemplary embodiment of the present invention, the first and second molded ellipsoidal reflector sections can be of similar size, each having diameter of approximately 2.5 inches, but the distance is approximately 2 inches between the source and target.

In higher wattage applications, the optical system is relatively larger to provide desirable collection of the higher electromagnetic energy levels and to accommodate the potentially larger lamps. For example, when using a high wattage lamp, on the order of 5,000 Watts, each of the primary molded ellipsoidal reflector sections has a diameter of 20 inches, and the separation between the source and the target is about 40 inches. As noted herein, the embodiment of FIG. 6 uses primary molded ellipsoidal reflector sections of similar size but results in a reduced distance between the source and target. For instance, an exemplary high wattage optical system in accordance with embodiment of the FIG. 6, also uses first and second molded ellipsoidal reflector sections with a diameter of approximately 20 inches but has a distance between of the source and target of 16 inches.

The invention, having been described, it will be apparent to those skilled in the art that the same may be varied in many ways without departing from the spirit and scope of the invention. Any and all such modifications are intended to be included within the scope of the following claims.

What is claimed is:

1. A compact dual ellipsoidal reflector (DER) system for illuminating a target with rays of electromagnetic radiation comprising two modules, each module having at least an ellipsoidal reflector molded section comprising an optical axis, a first focal point and a second focal point; and wherein said two modules are positionable with respect to each other such that said ellipsoidal reflector molded section of one module is positioned and oriented to receive at least a portion of the rays of radiation reflected from said ellipsoidal reflector molded section of other module and to reflect said portion of said rays of radiation to an opening in said other module located substantially proximate to said second focal point of said ellipsoidal reflector section of said other module, thereby forming said compact DER system.

2. The compact DER system of claim 1, wherein said opening is for a target.

3. The compact DER system of claim 2, wherein said target is a tapered light guide.

4. The compact DER system of claim 2, further comprising a color wheel located substantially proximate said second focal point of said ellipsoidal reflector molded section of said other module such that light existing said compact DER system through said target forms a sequential color sequence.

5. The compact DER system of claim 1, further comprising an opening formed by said two modules to insert a light source for providing said rays of electromagnetic radiation, which is located substantially proximate to said first focal point of said ellipsoidal reflector molded section of said other module.

6. The compact DER system of claim 1, further comprising an opening formed by said two modules to place a fan to cool said compact DER system.

7. The compact DER system of claim 1, wherein said first ellipsoidal reflector molded section of said other module has a coating that reflects only a pre-specified portion of the electromagnetic radiation spectrum.

8. The compact DER system of claim 7, wherein said coating only reflects either visible light radiation, a pre-specified broadband of radiation or a specific color of radiation.

9. The compact DER system of claim 1, wherein a portion of said rays of electromagnetic radiation impinges directly on said ellipsoidal reflector molded section of said other module and a portion of the electromagnetic radiation does not impinge directly on said ellipsoidal reflector molded section of said other module; and wherein said one molded module comprises an additional reflector molded section for reflecting at least portion of the portion of the electromagnetic radiation that does not impinge directly on said ellipsoidal reflector molded section of said other module toward said ellipsoidal reflector molded section of said other module through said first focal point of said ellipsoidal reflector molded section of said other module to increase the flux intensity of the converging rays.

10. The compact DER system of claim 9, further comprising an opening formed by said two modules to insert a light source for providing said rays of electromagnetic radiation, which is located substantially proximate to said first focal point of said ellipsoidal reflector molded section of said other module; and wherein said additional reflector molded section comprises a spherical retro-reflector molded section on said one module opposite said ellipsoidal reflector molded section of said other module to reflect said rays of electromagnetic radiation emitted from said light source in a direction away from said ellipsoidal reflector molded section of said other module toward said ellipsoidal reflector molded section of said other module through said first focal point of said ellipsoidal reflector molded section of said other module.

11. The compact DER system of claim 1, wherein said optical axes of said ellipsoidal reflector molded sections of said two modules substantially coincide with one another and wherein said ellipsoidal reflector molded sections of said two modules are arranged in an opposed, facing relation with respect to each other.

12. The compact DER system of claim 1, wherein said light source comprises one of the following: a light emitting arc lamp, a xenon lamp, a metal halide lamp, an HID lamp, a mercury lamp or a filament lamp.

13. The compact DER system of claim 1, wherein said ellipsoidal reflector molded section of said two modules are symmetric with respect to each other.

14. The compact DER system of claim 13, wherein said ellipsoidal reflector molded sections of said two modules have substantially same eccentricity.

15. The compact DER system of claim 1, wherein said ellipsoidal reflector molded section of said two modules are asymmetric with respect to each other.

16. The compact DER system of claim 15, wherein said ellipsoidal reflector molded sections of said two modules have different eccentricity.

17. The compact DER system of claim 15, wherein said ellipsoidal reflector molded sections of said two modules have different focal lengths.

18. The compact DER system of claim 17, wherein said opening is for a target; and wherein said focal length of said ellipsoidal reflector molded section of said one module is longer than said focal length of said first ellipsoidal reflector molded section of said other module, which lowers the incidence angle of said rays of radiation inputted to said target.

19. The compact DER system of claim 17, wherein the focal length difference between said focal lengths of said ellipsoidal molded reflector sections of said two modules is selected to optimize the tradeoff between Fresnel reflection loss and image aberration.

20. The compact DER system of claim 17, wherein said optical axes of said ellipsoidal reflector molded sections of said two modules are substantially parallel with respect to one another and wherein said ellipsoidal reflector molded sections of said two modules axe arranged in an opposed, facing relation with respect to each other.

21. The compact DER system of claim 15, wherein asymmetric characteristics of said ellipsoidal reflector molded sections of said two modules are selected to maximize net output coupling efficiency.

22. The compact DER system of claim 15, wherein said optical axes of said ellipsoidal reflector molded sections of said two modules are not coincident with each other.

23. The compact DER system of claim 15, wherein a portion of said rays of electromagnetic radiation impinges directly on said ellipsoidal reflector molded section of said other module and a portion of the electromagnetic radiation does not impinge directly on said ellipsoidal reflector molded section of said other module; and wherein said one module comprises an additional reflector molded section for reflecting at least portion of the portion of the electromagnetic radiation that does not impinge directly on said ellipsoidal reflector molded section of said other module toward said ellipsoidal reflector molded section of said other module through said first focal point of said ellipsoidal reflector molded section of said other module to increase the flux intensity of the converging rays.

24. The compact DER system of claim 23, further comprising an opening formed by said two modules to insert a light source for providing said rays of electromagnetic radiation, which is located substantially proximate to said first focal point of said ellipsoidal reflector molded section of said other module; and wherein said additional reflector molded section comprises a spherical retro-reflector molded section on said one module opposite said ellipsoidal reflector molded section of said other module to reflect said rays of electromagnetic radiation emitted from said light source in a direction away from said ellipsoidal reflector molded section of said other module toward said ellipsoidal reflector molded section of said other module through said first focal point of said ellipsoidal reflector molded section of said other module.

25. The compact DER system of claim 15, wherein said optical axes of said ellipsoidal reflector molded sections of said two modules are substantially parallel with respect to one another and wherein said ellipsoidal reflector molded sections of said two modules are arranged in an opposed, facing relation with respect to each other.

26. The compact DER system of claim 15, wherein each of said ellipsoidal reflector molded sections of said two modules has diameter that is substantially greater than a distance between said first focal point of said ellipsoidal reflector molded section of said other module and said second focal point of said ellipsoidal reflector molded section of said one module.

27. The compact DER system of claim 15, wherein said ellipsoidal reflector molded section of said one module receives at least a portion of said rays of electromagnetic radiation that pass through said first focal point of said ellipsoidal reflector molded section of said one module; and wherein said ellipsoidal reflector molded section of said one module being positioned and oriented with respect to said ellipsoidal reflector molded section of said other module such that said second focal point of said ellipsoidal reflector molded section of said other module and said first focal point of said ellipsoidal reflector molded section of said one module are positioned substantially proximate.

* * * * *